United States Patent [19]
Moore et al.

[11] Patent Number: 5,150,124
[45] Date of Patent: Sep. 22, 1992

[54] BANDPASS FILTER DEMODULATION FOR FM-CW SYSTEMS

[75] Inventors: Gerald J. Moore, Mesa; Curtis L. Eickerman, Tempe, both of Ariz.

[73] Assignee: Motorola, Inc., Schaumburg, Ill.

[21] Appl. No.: 674,010

[22] Filed: Mar. 25, 1991

[51] Int. Cl.[5] .................. G01S 13/32; F42C 13/04
[52] U.S. Cl. .................. 342/68; 342/128; 342/193; 329/318
[58] Field of Search .......... 342/68, 128, 193; 329/314, 318, 362, 341, 342

[56] References Cited

U.S. PATENT DOCUMENTS

| | | | |
|---|---|---|---|
| 4,507,625 | 3/1985 | Lee et al. | 329/362 X |
| 4,973,967 | 11/1990 | David et al. | 342/68 X |
| 4,975,653 | 12/1990 | Kennedy et al. | 329/318 |

OTHER PUBLICATIONS

Martin et al., "Switched-Capacitor Building Blocks for Adaptive Systems," IEEE Trans. Circuits and Systems, vol. CAS-28, No. 6, Jun. 1981, pp. 576-584.

*Primary Examiner*—Gilberto Barrón, Jr.
*Attorney, Agent, or Firm*—Jeffrey D. Nehr

[57] ABSTRACT

A method and device for bandpass filter demodulation for FM-CW systems which includes providing a FM-CW signal to an input of a bandpass demodulator, amplifying the FM-CW signal, timing the bandpass demodulator at an integer multiple of the FM-CW signal frequency, and simultaneously demodulating/filtering the FM-CW signal to produce a signal in baseband containing suppressed carrier-Doppler sideband information from the FM-CW signal. The demodulating/filtering functions are performed in an appropriately biased and clocked switched capacitive filter.

6 Claims, 2 Drawing Sheets

BANDPASS FILTER DEMODULATION FOR FM-CW SYSTEMS

BACKGROUND OF THE INVENTION

This invention relates in general to the field of frequency-modulated (FM) continuous-wave (CW) systems, and, more particularly, to bandpass filter demodulation for FM-CW harmonic processing radar.

In small caliber air target (SCAT) radar, for example, bandpass filtering and demodulation are key steps in the fuzing process which determines when to fire a small caliber munition. The SCAT radar system, housed in the fuze of the small caliber munition, makes the determination to issue the fire command based on an analysis comparing a radar signal reflected from the target to the radar signal transmitted by the SCAT radar system. The reflected signal is detected and mixed with the transmitted signal to produce a difference signal. The difference signal can be analyzed for Doppler shift and other information which forms the input for a fuzing algorithm to analyze. Based on predetermined criteria, the fuzing algorithm determines whether to issue the fire command. The bandpass and demodulation functions, operating on the difference signal, produce the input signal to the fuzing algorithm.

Bandpass filter demodulation can be achieved in discrete implementations using active or passive filtering and demodulation or in a non-precision integrated circuit (IC) analog implementation requiring external components. Neither of these conventional methods provides a very workable approach for bandpass filter demodulation in SCAT radar, however. Discrete implementation, requiring external parts, is not well suited to the very limited packaging volume available in small caliber fuzes. Similarly, the need for a fairly selective bandpass filter at 500 kiloHertz (kHz) and a multi-pole Doppler filter with a 50 kHz bandwidth for SCAT radar places severe demands on the external parts count or requires the use of "on chip" resistors and capacitors which are very low-precision components producing excessive filter performance variability.

Thus, a method and device for permitting a bandpass filter function and low-pass Doppler filter function to be realized in a single functional element also performing demodulation are highly desirable. Such a bandpass filter demodulator should minimize the need for external parts, reduce the circuitry required for the filtering and demodulation over discrete implementations and non-precision IC analog implementations and produce a filtering function which automatically tracks variations in system timing.

SUMMARY OF THE INVENTION

Accordingly, it is an advantage of the present invention to provide a method and improved apparatus for providing a bandpass filter function and a low-pass Doppler filter function in a single functional element also providing demodulation. It is a further advantage of the present invention to provide bandpass filtering and demodulation while minimizing the need for external parts and circuitry. It is still a further advantage of the present invention to provide apparatus for bandpass demodulation which automatically tracks variations in system timing.

To achieve these advantages, a method and device for bandpass filter demodulation for FM-CW systems is contemplated which includes providing a FM-CW signal to an input of a bandpass demodulator, amplifying the FM-CW signal, timing the bandpass demodulator at a sampling frequency which is a multiple of the FM-CW signal frequency, and simultaneously demodulating/filtering the FM-CW signal to produce a signal in baseband containing suppressed carrier-Doppler sideband information from the FM-CW signal. The demodulating/filtering functions are performed in an appropriately biased and clocked switched capacitive filter.

The above and other features and advantages of the present invention will be better understood from the following detailed description taken in conjunction with the accompanying drawings.

DETAILED DESCRIPTION OF THE PREFERRED EMBODIMENT

Figure 1:
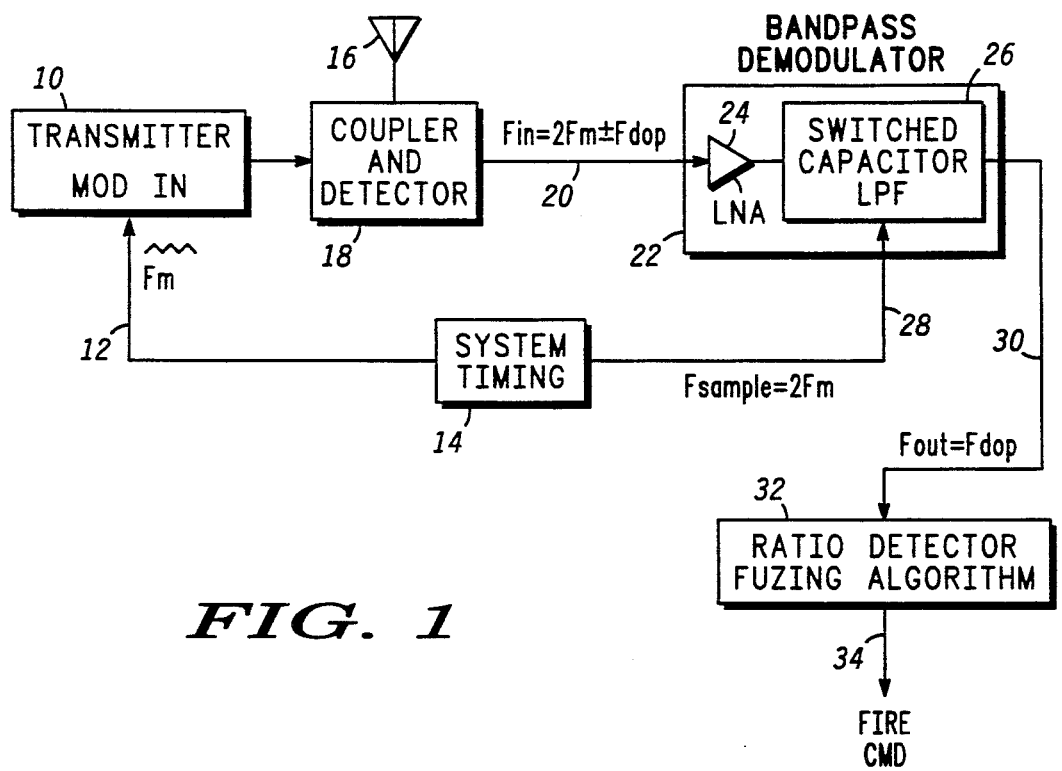
In FIG. 1, there is shown a block diagram of a bandpass filter demodulator in an FM-CW radar system.

In FIG. 1, there is shown a block diagram of an FM-CW radar system utilizing a bandpass filter demodulator. Transmitter 10 is coupled to coupler and detector 18 and system timing 14. Coupler and detector 18 is connected to antenna 16 and separately to bandpass demodulator 22. The bandpass demodulator 22 includes low-noise amplifier (LNA) 24 coupled to switched capacitor and low-pass filter (SCLPF) 26. Coupler and detector 18 is connected to low-noise amplifier 24. Switched capacitor low-pass filter 26 is coupled to system timing 14 and separately to ratio detector fuzing algorithm 32. Ratio detector fuzing algorithm 32 is also coupled to fire command 34.

Transmitter 10 produces a signal modulated in frequency at $F_{mod}$ as shown by FM input 12, which is sent to coupler and detector 18. Coupler and detector 18 sends the signal to antenna 16 where it is transmitted to a radar target. A reflected signal returns from the radar target to antenna 16 which sends the reflected signal to coupler and detector 18 where it is multiplied with the signal from the transmitter 10. The mixed signal and reflected signal produce $F_{in}$ signal 20 which contains the Doppler frequency, $F_{dop}$, modulated carrier signal information.

The $F_{in}$ signal 20 is send to the bandpass demodulator 22 for filtering and demodulation. LNA 24 receives the $F_{in}$ signal 20 from coupler and detector 18, amplifies it, and sends it to SCLPF 26 for simultaneous bandpass filtering, Doppler filtering, and demodulation.

SCLPF 26 is driven at a sample frequency $F_{sample}$ 28, which is a multiple of $F_{mod}$ (for example, 2 $F_{mod}$). The desire multiple can be chosen based on the desired harmonic in the reflected signal from the target. $F_{sample}$ 28 is provided by the system timing 14, which also provides signal modulation for transmitter 10 via FM input 12. For triangle-wave modulated FM-CW, or as otherwise required, the system timing 14 maintains phase coherency between the $F_{sample}$ 28 and the modulation frequency $F_{mod}$ for the SCLPF 26 to perform as a true mixer. The action of the SCLPF frequency divider chain must be clearly defined and integrally connected to the timing system 14 via $F_{sample}$ 28, in a specific phase relationship with FM input 12.

SCLPF 26 produces a frequency signal output, $F_{out}$ 30 consisting of the Doppler-shift frequency information, $F_{dop}$, which is sent to ratio detector fuzing algorithm 32. Based on predetermined fuzing algorithm criteria, ratio detector fuzing algorithm 32 issues the fire command 34.

Figure 2:
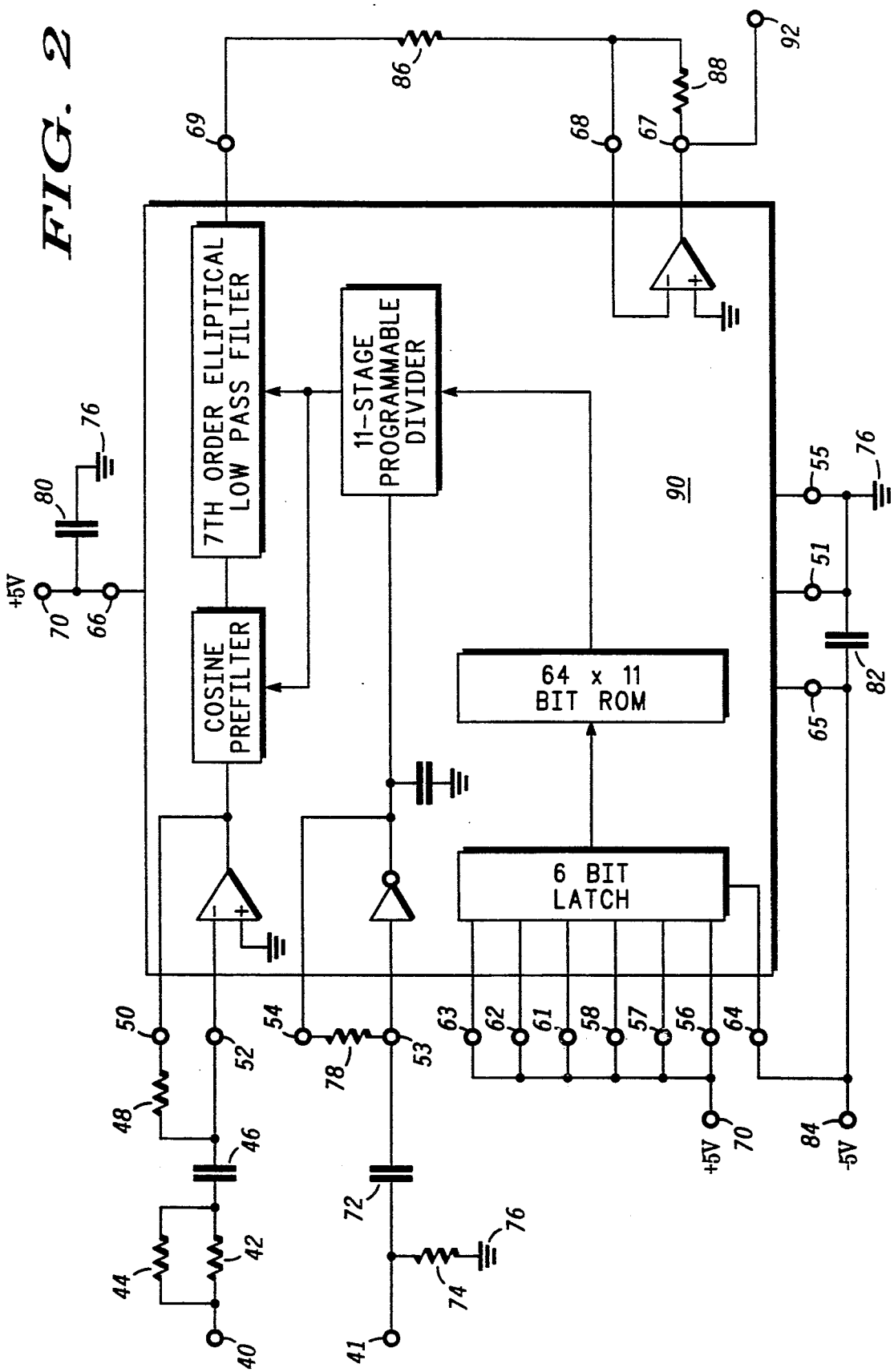
In FIG. 2, there is shown a circuit schematic of a switched capacitive/low-pass filter (SCLPF) for FM-CW signals.

FIG. 2 shows a circuit schematic of a SCLPF 26 for FM-CW signals including a switched capacitive filter (SCF) 90. The SCF 90 can be a Gould S3528 switched capacitive filter, including pins 50, 52, 54, 53, 63, 62, 61, 58, 57, 56, 64, 65, 51, 55, 67, 68, 69, and 66. Input pins 63, 62, 61, 58, 57 and 56 are connected together and biased appropriately, e.g. at +5 V, through connection 70. Signal input 40 is connected to a parallel combination of resistors 44 and 42. Resistors 44 and 42 can be of resistances 1 kΩ and 10 kΩ, respectively, to increase the gain of the input stage. Connected to the parallel combination of resistors 44 and 42 opposite signal input 40 is the input of capacitor 46, e.g., of capacitance 1 μF. Capacitor 46 can be used to eliminate the effect of DC offset in the input. The capacitor 46 output is connected to input pin 52, and also connected to resistor 48. Resistor 48 can be of resistance 10 kΩ and is connected to input pin 50.

Further biasing of SCF 90 is provided through connection 70 (e.g., at +5 V) to pin 66. Connection 70 additionally is coupled through capacitor 80 (e.g., of capacitance 0.01 μF) to electrical ground 76. An appropriate biasing through connection 84 (e.g., at −5 V) biases SCF 90 input pins 64 and 65 directly. Capacitor 82, which can be of capacitance 0.01 μF, is coupled on one side to connection 84. The other side of capacitor 82 is connected separately to pin 51 of SCF 90, to pin 55 of SCF 90, and to electrical ground 76.

Clock input 41 is connected through resistor 74, which can be of resistance 1000 Ω, to electrical ground 76. Clock input 41 is also directly coupled through capacitor 72, e.g., of capacitance 15 pF, to pin 53. Pin 53 is coupled through resistor 78, which is of high resistance, e.g., 10 MΩ, to pin 54.

SCF 90 output pins 69 and 68 are connected by resistor 86, which can be of value 10 kΩ. SCF 90 output pins 68 and 67 are connected by resistor 88, which can be of value 10 kΩ. Output pin 67 provides signal output 92.

In operation, a post mixing spectrum is input to signal input 40 of SCF 90. For example, the SCF 90 can be a 50 kHz device clocked at twice the modulation frequency, i.e., 500 kHz. The clock input 41 can be properly phased with the second harmonic of the modulator frequency and coherent with the input spectrum as well as the double sideband suppressed carrier target spectrum. The SCF 90 both demodulates and filters the post mixing spectrum.

Figure 3:
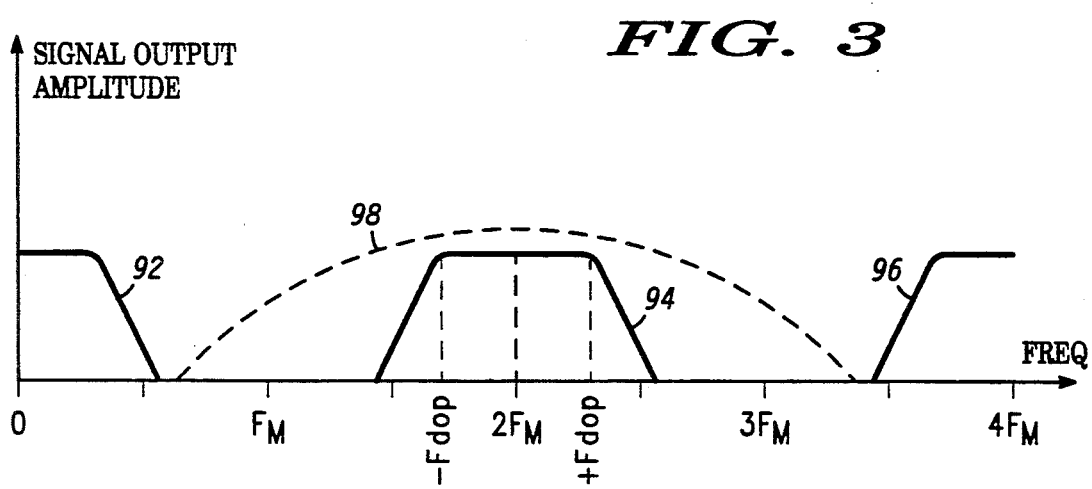
In FIG. 3, there is shown a representation of the filtered frequency response signal output from a SCLPF.

FIG. 3 shows the expected frequency response by action of SCF 90 after low-pass filtering and aliasing down to baseband of the double sideband suppressed carrier signal. Down converted waveforms 93, 94, and 96 represent baseband, 2 $F_m$, and 4 $F_m$ signals, respectively, that can be output from signal output 92. FIG. 3 represents signal amplitude versus frequency, where frequency is plotted as multiples of $F_m$. Moving upward in frequency, the remainder of the even multiples of $F_m$ would also be present (but are not shown in FIG. 3). The signal components at $F_m$, 3 $F_m$, 5 $F_m$, etc. would effectively be eliminated because the sample rate for SCF 90 is 2 $F_m$.

The signal that would result in the baseband Doppler signal 93 can be eliminated ahead of the switched capacitor filter 26, removing the baseband signal 93 from amplified $F_{in}$ 20. The frequency limitations of IC technology provide some inherent filtering of the 4 $F_m$ signal (e.g., 1 MHz if SCF 90 is a 50 kHz device). Thus, the amplitude of the 4 $F_m$ signal 96 output from signal output 92, as compared to the 2$F_m$ signal 94, is reduced.

Filtering to exclude the signals within amplified $F_{in}$ 20 that would result in the 4$F_m$ waveform 96 and higher-multiple $F_m$ harmonics can also be accomplished. A simple RC low-pass filter can be used to provide such filtering ahead of the SCF 90. The net result of the exclusion of baseband signal 93 and 4 $F_m$ signal 96 as well as higher $F_m$ multiples is to preserve 2 $F_m$ waveform 94 within net filtering envelope 98 as output from signal output 92 of SCF 90.

The selective filtering characteristics of SCF 90 eliminate the need for a bandpass filter, as evidenced by the relatively sharp "shoulders" of 4 $F_m$ signal 96 in FIG. 3. Also, since the clock input 41 is driven directly by system timing 14, variations in system timing 14 (for example, due to temperature changes) are automatically compensated for and do not inhibit the filtering or demodulation functions of bandpass demodulator 22.

Thus, a bandpass filter demodulator for FM-CW systems has been described which overcomes specific problems and accomplishes certain advantages relative to prior art methods and mechanisms. The improvements over discrete implementations using active or passive filtering and demodulation or in a non-precision integrated chip (IC) analog implementation requiring external components are significant. Discrete implementation, requiring external parts and relatively large volume, is not well suited to the very limited packaging in small caliber fuzes. Similarly, the need for a fairly selective bandpass filter and a multi-pole Doppler filter would require the use of low precision variable "on chip" resistors and capacitors in an IC implementation. Both traditional approaches result in additional costs over the bandpass filter demodulator contemplated here, by virtue of their increased part count and assembly complexity.

The bandpass filter demodulator for FM-CW systems described here permits a bandpass filter function, low-pass Doppler filter function, and demodulation function to be realized in a single functional element. The need for external parts and circuitry is reduced using a device and method that produces a filtering function which automatically tracks variations in system timing.

Thus, there has also been provided, in accordance with an embodiment of the invention, a bandpass filter demodulator for FM-CW systems that fully satisfies the aims and advantages set forth above. While the invention has been described in conjunction with a specific embodiment, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims.

We claim:

1. A radar system for processing a FM-CW harmonic signal comprising:
   transmitter means comprising a frequency modulation signal input and a transmitter output;
   antenna means comprising an antenna output;

coupler/detector means comprising a first coupler/detector input coupled to the transmitter output, a second coupler/detector input coupled to the antenna output, and a coupler/detector output;

bandpass demodulator means comprising a first bandpass demodulator input coupled to the coupler/detector output, a second bandpass demodulator input, and a bandpass demodulator output;

ratio detector fuzing algorithm means comprising a ratio detector fuzing algorithm input coupled to the bandpass demodulator output, and a ratio detector fuzing algorithm output; and system timing means comprising a first system timing output coupled to the frequency modulation signal input and a second system timing output coupled to the second bandpass demodulator input.

2. A radar system for processing a FM-CW harmonic signal as claimed in claim 1 where the first bandpass demodulator input comprises capacitive coupling means.

3. A radar system for processing a FM-CW harmonic signal as claimed in claim 1 wherein the bandpass demodulator means further comprises:

amplifier means comprising an amplifier input coupled to the coupler/detector output and an amplifier output; and switched capacitor means comprising a first switched capacitor input coupled to the amplifier output, a second switched capacitor input coupled to the system timing means, and a switched capacitor output coupled to the ratio detector fuzing algorithm input.

4. A radar system for processing a FM-CW harmonic signal as claimed in claim 3 wherein the amplifier means comprises a low noise amplifier.

5. A radar system for processing a FM-CW harmonic signal as claimed in claim 3 wherein the switched capacitor means further comprises:

signal input means coupled to the amplifier output;
clock input means coupled to the system timing means;
a switched capacitor bias input coupled to the switched capacitor means; and
a bias means coupled to the switched capacitor bias input.

6. A radar system for processing a FM-CW harmonic signal as claimed in claim 5 wherein the switched capacitor means further comprises a frequency divider means for maintaining phase coherency between the FM-CW harmonic signal and the frequency modulation signal.

* * * * *